Jan. 27, 1942.    J. E. WOODS    2,270,988
METHOD OF MAKING METAL TUBES
Filed Aug. 1, 1940
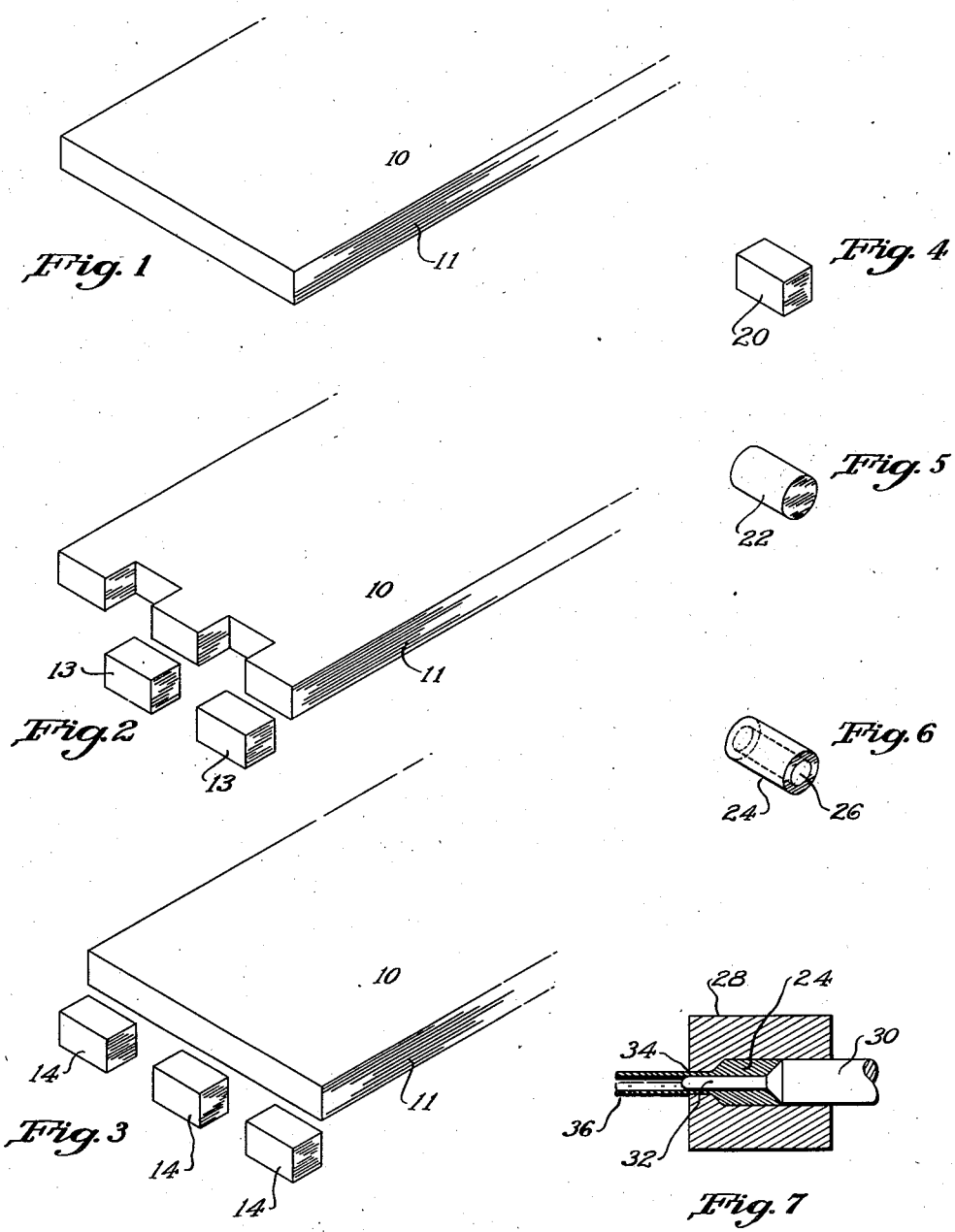
Witness
Paul F. Bryant
Inventor
John E. Woods
by his attorneys
Fish Hildreth Cary & Jurney Patented Jan. 27, 1942

2,270,988

UNITED STATES PATENT OFFICE 2,270,988

METHOD OF MAKING METAL TUBES

John E. Woods, Brookline, Mass., assignor to Clifford Manufacturing Co., Boston, Mass., a corporation of Delaware Application August 1, 1940, Serial No. 349,137

2 Claims. (Cl. 29—156)

The present invention relates to the production of metallic tubes, and more particularly to the so-called thin wall metallic tubes made of copper or aluminum and suitable for tubular heat exchangers for use in radiation, or for the production of cartridge cases and small ammunition.

The object and purpose of the present invention is to produce economically and efficiently the material in the form of slugs from which the requisite tubes may be extruded. In the prior patent to Hooker, which illustrates the method of extruding metallic tubing, the blank which is extruded is preferably in the form of a cup of proper dimensions drawn in the usual manner from a sheet. In a later patent to Robinson No. 1,715,099, it is suggested that this cup be replaced by a slug which may be slabbed from a drawn rod of proper dimensions and pierced or indented to provide the requisite opening. The process of the Robinson patent is predicated on the theory that by shearing slugs from a lengthwise rod with the grain parallel to the axis of the slug and thence extruding in the direction of the grain, a better and more homogeneous tube is secured.

For the attainment of my purpose I have found that superior results can be obtained by providing a rolled or drawn sheet of copper or aluminum, shearing straight-sided blanks from this sheet which may be in the form of cubes or the like, converting these straight-sided blanks in which the grain extends transversely into cylindrical blanks by a swedging operation or the like, and thence after properly indenting these blanks extruding them in an axial direction. With this arrangement the blanks may be formed from a sheet as in the case of a rod with no waste or scrap loss, and subsequently by conversion of the straight-sided blanks into a cylindrical slug where the dimensions may be held precisely as in the case of a forming or swedging operation, I am enabled to produce blanks of exact dimensions and conformation which work best in the extrusion operation without on the one hand the cost of producing the drawn cups, and on the other hand the distortion of the slugs which may be and in all likelihood is the case when cutting these slugs from lengths of drawn rod. In any event, I have found by actual experience that slugs or blanks made in this fashion are excellent for extrusion purposes, and produce extruded tubes of high quality.

In the accompanying drawings illustrating the preferred form of the invention, Fig. 1 represents a rolled metallic sheet from which the blanks are cut; Fig. 2 is a view of the same sheet with alternate blanks sheared from the leading edge, the operation being to first shear alternate blanks as shown, leaving remaining spaced blanks projecting; Fig. 3 illustrates the same sheet following the second shearing operation in which the remaining blanks are removed; Fig. 4 is a view of the straight-sided blank with the grain extending transversely; Fig. 5 is a view of the blank converted into cylindrical form with the grain extending transversely of the axis; Fig. 6 is a view of the same blank properly pierced or indented; and Fig. 7 is a view illustrating the blank subjected to the extruding action of an extrusion punch or die.

As indicated in the illustrated embodiment of the invention, I may start with a rolled sheet 10 of copper, aluminum or any other material which may be suitably extruded. The grain of this material, as indicated at 11, extends lengthwise of the sheet. In the succeeding operation I sever from the leading edge of this sheet spaced blanks 13, leaving the edge in the notched condition illustrated in Fig. 2. Thereafter in the same or a succeeding operation I shear the blanks 14, completely clearing the edge in condition for an advancing feed of the sheet. These blanks may be as indicated in Figs. 4 to 6, Fig. 4 illustrating the straight-sided blank at 20, Fig. 5 the blank as converted into cylindrical form at 22 with the grain extending transversely of the axis, and Fig. 6 the blank as indicated at 24 with an axial opening 26 formed therein.

The blank thus formed, which is precise in its dimensions and conformation, is automatically fed to an extrusion die 28 in which the blank 24 is received. It is then operated upon by a punch 30 having a rod 32 extending therefrom smaller in dimensions than the exit opening 34 of the die. The plunger operating with great pressure upon the metal of the blank 24 causes it to extrude and flow outwardly as indicated at 36 in the form of a relatively thin walled and elongated tube, the walls of the opening 34 controlling the outer dimensions of the tube, and the pin 32 lying within the exit opening controlling the resultant bore of the tube.

The process of extruding in this manner has been previously known and used, and accordingly no claim is made specifically to this. This method, however, requires extreme accuracy in the form and dimensions of the blank so that it may properly fit within the die and feed thereto, and the method of producing this blank as I have indicated it is especially useful in connection with the extrusion process, the blank not only permitting its formation without scrap, but being subjected to an accurate sizing operation in the usual course of production which insures against variations in this respect.

What is claimed is:

1. The method of making metal tubes, which comprises shearing alternate straight-sided blanks from a metallic sheet having a grain extending transversely of the blanks, swedging the straight-sided blanks into cylindrical blanks having a grain extending mainly transversely of the axis, indenting the blank to form an opening lengthwise thereof, and extruding the blank in an axial direction to produce a metallic tube.

2. The method of making metal tubes, which comprises severing a series of blanks of oblong rectangular parallelepiped form from a rolled sheet, swedging the straight-sided blanks into substantially cylindrical blanks with the grain extending mainly transversely of the axis of the blank, indenting the blank to form an opening lengthwise thereof, and extruding the blank in an axial direction to produce a metallic tube.

JOHN E. WOODS.